July 23, 1940.	S. A. SNELL	2,209,175
VELOCIPEDE STRUCTURE
Filed April 11, 1938

INVENTOR
SAMUEL A. SNELL
BY
ATTORNEYS

Patented July 23, 1940

2,209,175

UNITED STATES PATENT OFFICE 2,209,175

VELOCIPEDE STRUCTURE

Samuel A. Snell, Toledo, Ohio, assignor to The American-National Company, Toledo, Ohio, a corporation of Ohio Application April 11, 1938, Serial No. 201,409

2 Claims. (Cl. 280—282)

This invention relates generally to velocipedes and refers more particularly to the backbone, platform and rear axle assembly thereof.

One of the essential objects of the invention is to provide an assembly of this type wherein provision is made for anchoring a tubular backbone upon the rear axle on the underside of the platform.

Another object is to provide an assembly that is simple and compact in construction, economical to manufacture, and strong and durable.

Other objects, advantages and novel details of construction of this invention will be made more apparent as this description proceeds, especially when considered in connection with the accompanying drawing, wherein.

Figure 1:
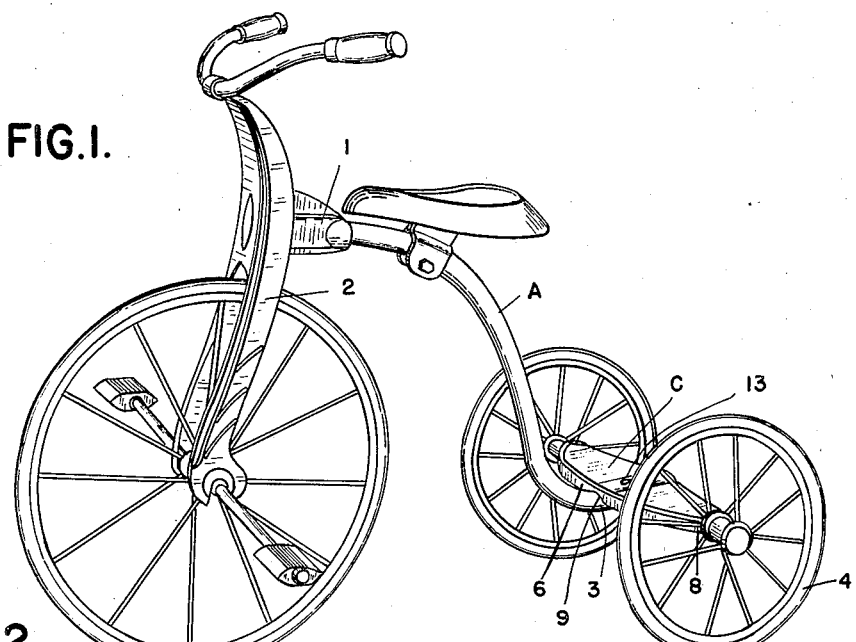
Figure 1 is a perspective view of a velocipede having an assembly embodying my invention.
Figure 2:
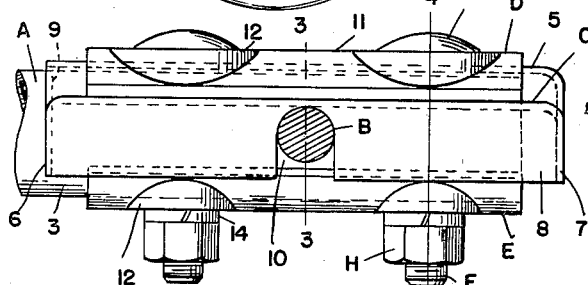
Figure 2 is a fragmentary elevation of the assembly.

Referring now to the drawing, A is the backbone, B is the rear axle, and C is the platform of an assembly embodying my invention.

As shown, the backbone A is tubular in construction and curves downwardly and rearwardly from a suitable headpiece 1 connected to the front fork 2 of the velocipede. The rear end portion 3 of said backbone is substantially straight and extends beneath the platform C.

The rear axle B is preferably a cylindrical rod and extends diametrically through the rear portion 3 of the backbone. Suitable ground wheels 4 are mounted on this axle at opposite ends of the platform C.

The platform C is a sheet metal stamping and is provided substantially at the center thereof with an arched portion 5. Preferably this platform is provided at its front and rear edges with depending flanges 6 and 7 and is provided at its opposite ends with depending flanges 8. As shown, the front flange 6 has an opening 9 receiving the straight portion 3 of the backbone, while the end flanges 8 have openings 10 receiving the axle B.

Figure 3:
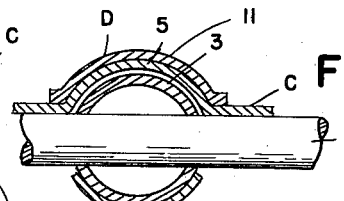
Figure 3 is a sectional view taken substantially on the line 3—3 of Figure 2.
Figure 5:
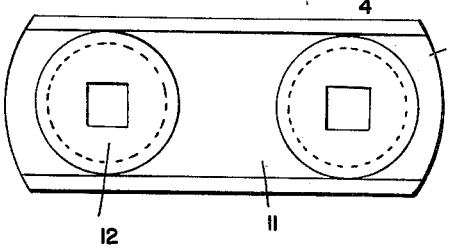
Figure 5 is a top plan view of the upper clamping member.
Figure 4:
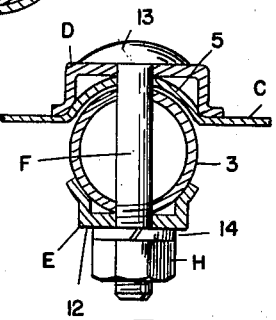
Figure 4 is a sectional view taken substantially on the line 4—4 of Figure 2.
Figure 6:
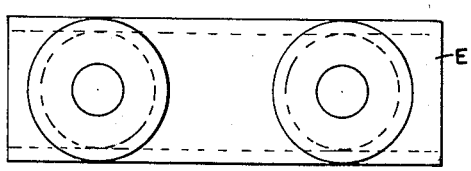
Figure 6 is a bottom plan view of the lower clamping member.

For holding the parts in fixed relation as aforesaid, I have provided a pair of clamping members D and E, a pair of bolts F and nuts H. Preferably the clamping members D and E are formed from relatively heavy gauge sheet metal and each has a transversely curved or trough-shaped portion 11 and spaced flat portions 12. As illustrated in Figure 3, the curved portion 11 of the upper member D substantially conforms in curvature to and seats upon the arched portion 5 of the platform, while the curved portion 11 of the lower member E substantially conforms in curvature to and seats against the portion 3 of the backbone. The flat portions 12 of the upper member form seats for the bolt heads 13, while the flat portions 12 of the lower member form seats for washers 14. The bolts F extend through registering holes in the members D and E, platform C and backbone A, and the nuts H engage said bolts beneath the washers 14. Thus, a very positive connection between the parts is provided.

What I claim as my invention is:

1. In an assembly of the class described, a metal platform having depending flanges at opposite ends thereof and having a depending flange at its forward edge, a backbone extending through the depending flange at the forward edge of the platform substantially midway the ends thereof and disposed upon the underside of the platform, said backbone and the depending flanges at opposite ends of the platform having aligned holes therein, an axle extending through the aligned holes in said platform and backbone, a clamping member on top of the platform just above the backbone, a clamping member upon the underside of the backbone, and adjustable connections between said clamping members extending through the backbone in front and in rear of the axle.

2. In an assembly of the class described, a backbone having a substantially straight end portion, an elongated metal platform crossing the end portion of said backbone, said platform having depending flanges at opposite ends thereof and having a depending flange at its forward edge, the depending flange at the forward edge of the platform having an opening receiving the straight end portion of the backbone, the straight portion of said backbone and the depending flanges at opposite ends of the platform having aligned holes therein, an axle extending through the aligned holes in said platform and backbone, the portion of the platform above the straight end portion of the backbone being arched and embracing the upper side of the straight end portion of the backbone, and a clamping connection between the platform and backbone including a clamping member straddling the arched portion of the platform, a clamping member on the underside of the straight end portion of the backbone, and connections between said clamping members extending through the arched portion of the platform and through the straight end portion of the backbone in front and in rear of the axle.

SAMUEL A. SNELL.